United States Patent [19]

Sundet

[11] Patent Number: 5,015,382
[45] Date of Patent: May 14, 1991

[54] MICROPOROUS SUPPORT LAYER WITH INTERFACIALLY POLYMERIZED COPOLYAMIDE MEMBRANE THEREON

[75] Inventor: Sherman A. Sundet, Wilmington, Del.

[73] Assignee: E. I. Du Pont de Nemours and Company, Wilmington, Del.

[21] Appl. No.: 341,037

[22] Filed: Apr. 20, 1989

[51] Int. Cl.⁵ ............................................. B01D 71/56
[52] U.S. Cl. ................................ 210/490; 210/500.38
[58] Field of Search ........................... 210/490, 500.38; 264/41, 232, 340, 344

[56] References Cited

U.S. PATENT DOCUMENTS

| | | | |
|---|---|---|---|
| 3,744,642 | 7/1973 | Scala et al. | 210/500 |
| 4,259,183 | 3/1981 | Cadotte | 210/500.37 X |
| 4,277,344 | 7/1981 | Cadotte | 210/654 |
| 4,520,044 | 5/1985 | Sundet | 427/244 |
| 4,529,646 | 7/1985 | Sundet | 428/315.5 |
| 4,626,468 | 12/1986 | Sundet | 428/315.5 |
| 4,643,829 | 2/1987 | Sundet | 210/500.33 |
| 4,719,062 | 1/1988 | Sundet | 264/41 |
| 4,761,234 | 8/1988 | Uemura et al. | 210/500.38 |
| 4,783,346 | 11/1988 | Sundet | 427/244 |
| 4,828,708 | 5/1989 | Bray | 210/654 |
| 4,888,116 | 12/1989 | Cadotte et al. | 210/500.38 X |

FOREIGN PATENT DOCUMENTS 63-218208  9/1988  Japan .

*Primary Examiner*—Frank Spear
*Attorney, Agent, or Firm*—John A. Parrish

[57] ABSTRACT

Copolyamide desalination membranes formed by interfacial polymerization on a microporous support are disclosed. The copolyamide is formed by copolymerization of m-phenylene diamine with cyclohexane-1,3,5-tricarbonyl chloride and any of isophthaloyl chloride, terephthaloyl chloride, alkylene diacyl chlorides containing 4 to 12 carbon atoms, cyclohexane dicarbonyl chlorides and mixtures thereof wherein the average functionality of the acyl chlorides is from 2.20 to 2.80.

8 Claims, No Drawings

MICROPOROUS SUPPORT LAYER WITH INTERFACIALLY POLYMERIZED COPOLYAMIDE MEMBRANE THEREON

FIELD OF THE INVENTION

The present invention relates to composite membranes suitable for use in reverse osmosis processes such as the desalination of aqueous solutions. More particularly the present invention relates to a multilayer membrane in which one layer is a copolymer of meta-phenylenediamine with cyclohexane-1,3,5-tricarbonyl chloride and at least one difunctional acyl chloride.

BACKGROUND OF THE INVENTION

Permselective membranes suitable for use in desalination of aqueous solutions are the subject of numerous patents. Cadotte U.S. Pat. No. 4,277,344 discloses permselective multi-layer membranes in which there is a microporous polysulfone substrate layer and a superposed polyamide layer made from an aromatic triacid halide and an aromatic diamine. Scala et al. U.S. Pat. No. 3,744,642 discloses multilayer membranes in which one layer is porous substrate and the juxtaposed layer is a polyamide, a polyphenylester, or a polysulfonamide. Weyland et al. U.S. Pat. No. 3,649,687 discloses the use of 1,3,5-cyclohexane tricarbonyl chloride in the production of crosslinking agent: 1,3,5-cyclohexane triisocyanate. U.S. Pat. Nos. 4,520,044 and 4,529,646 disclose permselective multilayer membranes in which there is a microporous polysulfone support and a polyamide layer made using 1,3,5-cyclohexane tricarbonyl chloride and a diamine.

U.S. Pat. No. 4,626,468 discloses permselective multilayer membranes in which there is a microporous polysulfone support and a polyamide layer made from meta-phenylenediamine and based on polymerized acid chloride present from 10 to 80 weight percent repeating units derived from trimesoyl chloride, 90 to 15 weight percent repeating units derived from cyclohexane-1,3,5-tricarbonyl chloride and up to 40 weight percent repeating units derived from isophthaloyl chloride, terephthaloyl chloride or mixtures thereof.

U.S. Pat. No. 4,783,346 discloses a multistage process for preparing interfacially polymerized polyamide reverse osmosis membranes on a microporous support. The process involves first applying a solution containing from 1 to 10 wt % of an aromatic diamine having 1 or 2 rings and then a solution of a mixture of acyl chlorides having a combined average per acyl chloride containing molecule of 2.2 to 4 acyl chloride groups in a solvent immiscible with the first solvent applied to the microporous substrate. Then a solution of different acyl chlorides is applied to the substrate. The individual acyl chlorides in this second solution can have 2.2 to 4 acyl chloride groups attached to an alkylene aliphatic group of 4 to 12 carbon atoms or an aromatic or cycloaliphatic group having 1 or 2 rings and containing 6 to 14 carbon atoms.

U.S. Pat. No. 4,643,829 discloses a multilayer membrane for performing reverse osmosis comprising a porous support and a layer formed of poly(meta-phenylenecyclohexane-1,3,5-tricarboxamide).

SUMMARY OF THE INVENTION

The present invention is a multilayer membrane comprising a microporous support layer and a superposed layer of a copolyamide derived from m-phenylenediamine with cyclohexane-1,3,5-tricarbonyl chloride and either aromatic or aliphatic diacyl chlorides.

In a preferred embodiment the microporous substrate is a polysulfone, and the average pore size of polysulfone is less than about 20 nanometers in diameter. The substrates used were tested and no pores of greater than 100 nm were detected. Our electron photomicrography indicated that few pores are more than five or ten nanometers in diameter.

A convenient method of preparation of the membrane of the invention is by interfacial condensation polymerization, i.e. contacting the polysulfone substrate with a solution of meta-phenylenediamine, and then contacting the polysulfone substrate with a solution of acid chlorides being used. The cyclohexane tricarbonyl chloride used can be the cis form, the trans form or mixtures thereof. This method yields very thin films since the reaction is diffusion controlled and self-limiting.

In the membranes of this invention the microporous substrate will normally be about 0.5 to 5 mils thick, and the copolyamide layer will normally be about 20 to 200 nanometers thick.

Detailed Description

The procedures of Cadotte U.S. Pat. No. 4,277,344 or Sundet U.S. Pat. Nos. 4,520,044 or 4,529,646 are illustrative of the conditions needed for preparing composite membranes of this type. The process consists essentially of several steps:

A microporous substrate with an average pore size of less than 20 nm in a diameter is prepared. This may be accomplished with a polysulfone, cast from a 15% solution thereof in dimethylformamide and immediately quenched in water to precipitate the polysulfone and extract the solvent. The adequacy of quality of these membranes is conveniently checked by a programmed pressurization with nitrogen to determine that the amount of nitrogen passed at up to 200 psi is very small.

This substrate (dried and stored, or fresh and wet) is then loaded with an aqueous solution of the aromatic diamine at a concentration of 0.5–10%, preferably 1–3% in the water, and the excess solution removed from the surface by some draining, rolling or sponging procedure. The concentration of the diamine is an important factor in the performance of the resulting composite. Too low a diamine concentration results in a sacrifice in salt rejection with a gain in flux. Too high a concentration of diamine results in a loss in flux.

If desired the cast polysulfone can be quenched in an aqueous solution containing 0.1–10% by weight, preferably 0.5–5% by weight and most preferably 1–3% by weight aromatic diamine. This technique often produces a composite membrane superior to that obtained using the two step aqueous quench followed by loading with diamine process described above.

The loaded substrate is then immersed in a solution of the mixed acid chlorides in Freon ®TF chlorofluorocarbon liquid or hexane or mixtures thereof (solvents which do not adversely affect the porous structure of the polysulfone substrate) for 5–90, preferably 10–35-seconds at room temperature. Formation of the polyamide causes the originally shiny substrate to develop a dull finish.

The resulting composite is then dried at temperatures of 20°–100° C., preferably 50°–70° C., for periods of 5–180 seconds, preferably 15–60 secs., to establish adhesion of the surface polyamide to the polysulfone substrate.

The residual diamine and reaction byproducts are extracted by soaking in water, or preferably in a plurality of aqueous solutions of a lower alkanol followed by soaking in water. This is suitably done at temperatures of 20° C. to 70° C.

The present invention relates to the discovery that copolyamide rejection layers prepared with mixtures of cyclohexane-1,3,5-tricarbonyl chloride and a variety of bifunctional acid chlorides show minimum salt passages at functionalities in the range of 2.20–2.80. The preferred acyl chloride functionalities for the copolymers containing the aromatic and cycloaliphatic diacyl chlorides is 2.20–2.40. The preferred acyl chloride functionalities for the copolymers containing the alkylene diacyl chlorides is from 2.35–2.80. The preferred acyl chloride functionality for adipoyl chloride is 2.35 to 2.50, for sebacoyl chloride from 2.4 to 2.65 and for azelaoyl chloride from 2.6 to 2.8. At higher functionalities the flux constants trend higher at some sacrifice to salt rejection and at lower functionalities the salt rejection deteriorate catastrophically. This is a preferred composition range. (Functionality is the apparent average number of carbonyl chloride groups present per acyl chloride reactant molecule of the mixture of di and tri functional acyl chlorides present in the reactant solution).

The most important factors in the preparation of a salt-rejecting layer on a composite membrane by the process of interfacial polyamidation appear to be:

(a) the functionality of the acid chloride which determines in large part the time and conversion (in polyamide formation) at which a cross-linked polyamide gel is formed and separates from solution, and (b) those other structural features (geometry, etc) of the reactants that determine the transient solubility of the polyamide in the poor solvents normally employed in the formation of such composites.

The advantage gained by modifying the cyclohexane tricarbonylchloride with diacid chlorides quite clearly derives from a changed morphology in the polyamide deposit, but whether this change results from the decreased degrees of branching or from the increased solubility of the polyamide chain or from the lower concentration of carboxyl groups in the final polyamide has not been definitely established. At average functionalities below the optimum for any particular diacid dichloride the salt rejection of the polyamide deposit begins to deteriorate rapidly. This may simply be the effect of the lost branching function.

At minor modification (15–40%) the primary effect of the cyclic difunctional acid chlorides is to increase the flux of the membrane, often with increased salt passage. At 50–75%, however, (using cyclic difunctional acid chlorides) the flux decreases along with the salt passage. At 75% (using cyclic difunctional acid chlorides) the system begins to fail with a rapid increase in both salt passage and flux becoming apparent at about 80%. Similar modification occurs using the aliphatic diacid chlorides, but using differing amounts thereof.

The interfacial polyamidation process by which the polyamide layer is formed largely determines the conditions: suitable temperatures are from 0° C. to the boiling point of the organic solvent employed, suitable pressures are near atmospheric, with reaction times of 5 to 100 secs. Substituent groups in the diacid chloride must not interfere with the polyamidation reaction.

EXAMPLES

Example 1

Copolyamides of m-phenylenediamine with cyclohexane-1,3,5,-tricarbonyl chloride and terephthaloyl chloride.

A 16% solution of Udel P3500, a polysulfone derived from bisphenol A and p,p$^1$-dichlorodiphenyl sulfone having a molecular weight of about 35,000, in N,N-dimethylformamide, containing 0.2% Gafac RE610 (a surfactant which is a free acid, derived from a complex organic phosphate ester) and 0.6% water, was cast on a glass plate with a Gardner knife set at 6 mils (0.15 mm), then quenched promptly in deionized water, extracted in deionized water for three minutes before loading with aqueous m-phenylenediamine for three minutes at the concentrations indicated in Table 1 below. The microporous substrates so obtained exhibit relatively smooth surfaces with pores averaging less than 20 nm in diameter as seen with an electron microscope. Much larger pores (more than 100 nm in diameter) adversely affect salt rejection, but are difficult to find by microscopy. Their frequency was qualitatively assessed by measuring the amount of nitrogen gas forced through the wet substrate as the gas pressure was increased slowly (1 psi per second) up to 200 psi. For a substrate area of 50 cm$^2$, a volume of less than 10 ml of N$_2$ and preferably less than 5 ml was sought in this test. After removal of the surface droplets by rolling with a soft sponge rubber roller, the loaded polysulfone substrate was immersed in a solution of the acid chlorides in FREON TF (1,1,2-trichloro-1,2,2-trifluoroethane), at the concentrations indicated in Table 1. After 15 seconds of immersion, the membranes were drained for five seconds, then rinsed in FREON TF for ten seconds before drying in air for five minutes. The membranes were extracted in 15% aqueous ethanol at 25° C. for five minutes, 10% aqueous ethanol at 45° C. for five minutes, 5% aqueous ethanol at 65° C. for five minutes and in water at 80° C. for five minutes before storing in deionized water. Their permeability properties were determined in magnetically-stirred test cells of a standard design after a preliminary flush for one hour with a 15% aqueous ethanol solution at 70–80 psi (483–552 kPa). Measurements were made at 225 psi (1551 kPa) feed pressure with a feed solution containing 0.2% sodium chloride and 0.02% sodium azide as biocide. All the data presented were obtained after 16–22 hours of operation.

In the tables MPD stands for m-phenylene-diamine, HTMesCl stands for cyclohexane-1,3,5-tricarbonyl chloride, Ratio stands for the weight ratio of HTMesCl to the difunctional acyl chloride being used, Fncl stands for functionality which is average number of acyl chloride groups present per acyl chloride molecules present, %SP stands for % salt passage, and Kw is determined by the formula $Kw = \dfrac{\text{Flux}}{\text{Effective Pressure}}$ (in m/s/T Pa).

TABLE 1

| Run | MPD % | HTMesCl w/v % | TCl w/v % | Ratio HTMesCl/ TCl | Fncl. | % SP/Kw |
|---|---|---|---|---|---|---|
| 1-a | 1.4 | 0.16 | — | 100/0 | 3.00 | 2.52/8.83 |
| 1-b | " | 0.096 | 0.064 | 60/40 | 2.53 | 2.33/9.75 |

TABLE 1-continued

| Run | MPD % | HTMesCl w/v % | TCl w/v % | Ratio HTMesCl/TCl | Fncl. | % SP/Kw |
|---|---|---|---|---|---|---|
| 1-c | " | 0.080 | 0.080 | 50/50 | 2.43 | 1.68/8.99 |
| 1-d | " | 0.064 | 0.096 | 40/60 | 2.33 | 2.63/8.08 |
|  |  |  |  |  |  | 1.81/8.53 |
| 1-e | " | 0.056 | 0.104 | 35/65 | 2.29 | 1.78/7.40 |
| 1-f | " | 0.048 | 0.112 | 30/70 | 2.24 | 1.76/7.05 |
| 1-g | " | 0.040 | 0.120 | 25/75 | 2.20 | 1.96/6.58 |
| 1-h | " | 0.032 | 0.128 | 20/80 | 2.16 | 4.19/6.18 |
| 1-i | 1.7 | 0.064 | 0.096 | 40/60 | 2.33 | 2.75/6.63 2.85/8.00 |
| 1-j | " | 0.056 | 0.104 | 35/65 | 2.29 | 1.96/7.70 2.05/7.40 |
| 1-k | " | 0.048 | 0.112 | 30/70 | 2.24 | 3.38/6.63 1.81/6.95 |
| 1-l | " | 0.040 | 0.120 | 25/75 | 2.20 | 2.31/6.36 |
| 1-m | 2.0 | 0.080 | 0.080 | 50/50 | 2.43 | 3.30/7.72 |
| 1-n | " | 0.056 | 0.104 | 35/65 | 2.29 | 2.09/7.08 |
| 1-o | " | 0.048 | 0.112 | 30/70 | 2.24 | 1.76/6.75 |
| 1-p | " | 0.032 | 0.128 | 20/80 | 2.16 | 2.19/6.68 |

Example 2

Copolyamides of m-phenylenediamine with cyclohexane 1,3,5-tricarbonyl chloride and isophthaloyl chloride.

A solution in N,N-dimethylformamide containing 16% Udel P3500, 0.2% Gafac RE610 and 0.6% water was cast with a Gardner knife at a setting of 6 mils (0.15 mml) on a clean glass plate and quenched in deionized water at 23°–25° C. The microporous substrate so obtained was extracted for three minutes in deionized water, then soaked in a 1.4% solution of m-phenylenediamine in water for three minutes. This loaded substrate was rolled free of surface droplets with a soft sponge rubber roller, and immersed for 15 seconds in a solution of acid chlorides in FREON TF as indicated in Table 2 below. The membranes were then drained for 5–6 seconds, immersed in a 0.02w/v% solution of cyclohexane-1,3,5-tricarbonyl chloride for 10 seconds, and finally dried for five minutes in laboratory air.

The membranes were extracted five minutes in 15% ethanol at 25° C., five minutes in 10% ethanol at 45° C., five minutes in 5% ethanol to 65° C. and five minutes in water at 80° C. They were tested in magnetically-stirred cells of standard design for 16–20 hours at 225 psi with a feed solution containing 0.2% sodium chloride and sodium azide as biocide. the permeability properties are expressed in the table below as percent salt passage and the flux constant, Kw, in meters/second/TeraPascal. In Tables 2 and 3 ICl stands for isophthaloyl chloride.

TABLE 2

| Run | HTMesCl w/v % | ICl w/v % | Ratio | Fncl. | % SP/Kw |
|---|---|---|---|---|---|
| 2-a | 0.080 | 0.080 | 50/50 | 2.43 | 1.13/8.02 |
| 2-b | 0.064 | 0.096 | 40/60 | 2.33 | 0.88/6.92 |
| 2-c | 0.048 | 0.112 | 30/70 | 2.24 | 1.22/6.08 |

TABLE 2-continued

| Run | HTMesCl w/v % | ICl w/v % | Ratio | Fncl. | % SP/Kw |
|---|---|---|---|---|---|
| 2-d | 0.032 | 0.128 | 20/80 | 2.16 | 12.14/4.71 |

Additional membranes, prepared by the same procedure, except for the final extraction at 75° C. instead of 80° C., were tested at different time intervals to confirm the results.

TABLE 3

| Run | HTMesCl w/v % | ICl w/v % | Ratio | Fncl. | % SP/Kw 4.5 hrs | 17 hrs | 70 hrs |
|---|---|---|---|---|---|---|---|
| 2-e | 0.120 | 0.040 | 65/35 | 2.59 | 2.74/9.65 | 3.35/9.32 |  |
| 2-f | 0.096 | 0.064 | 60/40 | 2.53 | 2.88/9.05 | 4.34/8.75 |  |
| 2-g | 0.080 | 0.080 | 50/50 | 2.43 | 1.98/9.52 | 2.23/10.20 |  |
| 2-h | 0.072 | 0.088 | 45/55 | 2.38 |  | 1.72/8.54 | 1.68/7.82 |
| 2-i | 0.064 | 0.096 | 40/60 | 2.33 | 1.78/7.42 | 1.94/7.42 |  |
| 2-j | 0.056 | 0.104 | 35/65 | 2.29 |  | 1.52/9.60 | 1.38/9.42 |

Example 3

Copolyamides of m-phenylene diamine with cyclohexane-1,3,5-tricarbonyl chloride and adipoyl chloride.

Polysulfone substrates were prepared as in the above examples, but with quenching for one minute in 5% aqueous dimethylformamide (DMF) at 5° C. After extracting in deionized water for two minutes, this substrate was loaded by soaking in 1.4% aqueous m-phenylenediamine (MPD) for three to six minutes. After the surface droplets had been removed by rolling with a soft sponge rubber roller, the MPD-loaded substrate was reacted for fifteen seconds in the solution of the acid chloride in FREON TF, then for ten seconds in a solution of 0.02 w/v% cyclohexane-1,3,5-tricarbonyl chloride in FREON TF. It was then dried for five minutes in laboratory air, extracted thoroughly at temperatures up to 75° C. and stored in deionized water. The permeability properties were determined in magnetically-stirred cells of standard design at 225 psi with 0.2% sodium chloride containing 0.02% sodium azide as a biocide after 20–22 hours of operation. In Table 4 AdCl stands for adipoyl chloride.

TABLE 4

| Run | HTMesCl w/v % | AdCl w/v % | Ratio | Fncl. | % SP/Kw |
|---|---|---|---|---|---|
| 3-a | 0.16 | — | 100/0 | 3.00 | 3.62/8.63 4.27/7.83 |
| 3-b | 0.13 | 0.03 | 81/19 | 2.75 | 3.43/7.73 3.91/8.65 |
| 3-c | 0.12 | 0.04 | 75/25 | 2.67 | 2.75/6.85 |
| 3-d | 0.104 | 0.056 | 65/35 | 2.56 | 2.36/5.76 |
| 3-e | 0.10 | 0.06 | 62/38 | 2.52 | 1.71/9.55 2.01/7.57 |
| 3-f | 0.088 | 0.072 | 55/45 | 2.45 | 1.66/5.28 2.86/5.45 |
| 3-g | 0.072 | 0.088 | 45/55 | 2.36 | 1.49/4.51 1.84/4.75 |
| 3-h | 0.06 | 0.10 | 38/62 | 2.30 | 3.89/2.89 4.18/2.97 |

The data show the decrease in salt passage with the minimum being reached at a somewhat lower fraction of this aliphatic coacid chloride.

Example 4

Copolyamides of m-phenylenediamine with cyclohexane-1,3,5-tricarbonyl chloride and isophthaloyl-/terephthaloyl chlorides (70/30).

Polysulfone substrates were prepared as in the preceding examples (with adipoyl chloride), quenching in 5% DMF for one minute at 5° C. After extracting in 0.5% DMF for three minutes, the substrates were loaded with MPD by soaking in 1.6% aqueous MPD at 12°–15° C. for three minutes. The substrates were rolled free of surface droplets with a soft sponge rubber roller, then reacted for fifteen seconds in a solution of the acid chlorides indicated in Table 5 below in FREON TF, then for ten seconds in a solution of cyclohexane-1,3,5-tricarbonyl chloride (0.02 w/v%) before drying in the laboratory air for five minutes. These composite membranes were extracted for five minutes each in: 15% ethanol at 25° C., 10% ethanol at 45° C., 5% ethanol at 65° C., and water at 75° C. Tested by the standard procedures described above, these membranes gave the following permeability properties at 17–22 hours.

TABLE 5

| Run | HTMesCl w/v | ICl/TCl w/v % | Ratio | Fncl. | % SP/Kw |
|---|---|---|---|---|---|
| 4-a | 0.120 | 0.040 | 75/25 | 2.59 | 4.61/6.73 |
| 4-b | 0.080 | 0.080 | 50/50 | 2.43 | 4.36/9.06 |
| 4-c | 0.064 | 0.096 | 40/60 | 2.33 | 3.79/9.91 |
| 4-d | 0.048 | 0.112 | 30/70 | 2.24 | 3.14/8.76 |
| 4-e | 0.032 | 0.128 | 20/80 | 2.16 | 3.41/6.76 |

The results show the minimum in salt passage and the beginning of the rapid changes at 20/80.

Example 5

Copolyamides of m-phenylenediamine with cyclohexane-1,3,5-tricarbonyl chloride and cyclohexane-1,4-dicarbonyl chloride.

Substrates prepared as in the preceding example were loaded with 1.6% MPD at 25° C. for three minutes, then rolled free of surface droplets with a soft sponge rubber roller. They were reacted for fifteen seconds with mixtures of HTMesCl and cyclohexane-1,4-dicarbonyl chloride (the trans isomer) as indicated in Table 6 below, then with 0.02w/v% HTMesCl for ten seconds before drying for five minutes in the laboratory air. After extraction by the procedure described in the preceding example the membranes were subjected to the standard testing protocol and gave the following results after 22 hours.

TABLE 6

| Run | HTMesCl w/v % | HTCl w/v % | Ratio | Fncl. | % SP/Kw |
|---|---|---|---|---|---|
| 5-a | 0.120 | 0.032 | 79/21 | 2.74 | 3.37/8.94 |
| 5-b | 0.080 | 0.065 | 55/45 | 2.49 | 2.28/10.75 |
| 5-c | 0.064 | 0.077 | 45/55 | 2.39 | 2.01/11.45 |
| 5-d | 0.048 | 0.090 | 35/65 | 2.29 | 1.76/9.86 |

Example 6

Copolyamides of m-phenylenediamine with cyclohexane-1,3,5-tricarbonyl chloride and sebacoyl chloride (SeCl).

Polysulfone substrates, like those used in the previous examples but prepared with a polyester supporting fabric on a continuous semiworks machine, were loaded with 1.7% aqueous m-phenylenediamine (Table 7) for two minutes at 15° C., then rolled free of surface droplets with a soft sponge rubber roller. They were reacted for fifteen seconds with solutions of HTMesCl and SeCl in FREON TF as indicated, then with 0.03w/v% HTMesCl in FREON TF for ten seconds before drying for five minutes in laboratory air. After extraction by the procedure described in the previous examples, the membranes were subjected to standard testing protocol and gave the following results after 18–21 hours.

TABLE 7

| Run | HTMesCl w/v % | SeCl w/v % | Ratio | Fncl. | % SP/Kw |
|---|---|---|---|---|---|
| 6-a | 0.26 | — | 100/0 | 3.00 | 2.72/7.39 |
| 6-b | 0.23 | 0.03 | 88/12 | 2.86 | 2.38/7.35 |
| 6-c | 0.21 | 0.05 | 81/19 | 2.78 | 2.11/8.17 |
| 6-d | 0.18 | 0.08 | 69/31 | 2.65 | 1.60/6.51 |

Functionalities below 2.65 were explored in two further series, at two different levels of MPD, with similar results as reported in Table 8.

TABLE 8

| Run | MPD % | HTMesCl w/v % | SeCl w/v % | Ratio | Fncl. | % SP/Kw |
|---|---|---|---|---|---|---|
| 6-e | 1.7 | 0.18 | 0.08 | 70/30 | 2.65 | 0.68/4.67 |
| 6-f | " | 0.13 | 0.13 | 50/50 | 2.46 | 0.80/3.15 |
| 6-g | " | 0.10 | 0.16 | 38/62 | 2.34 | 1.12/2.19 |
| 6-h | " | 0.08 | 0.18 | 30/70 | 2.27 | 2.59/0.88 |
| 6-i | 0.7 | 0.045 | 0.025 | 64/36 | 2.60 | 1.21/6.79 |
| 6-j | " | 0.035 | 0.035 | 50/50 | 2.46 | 2.59/4.21 |
| 6-k | " | 0.025 | 0.045 | 36/64 | 2.32 | 2.27/1.38 |
| 6-l | " | 0.018 | 0.052 | 26/74 | 2.23 | 13.7/0.73 |

The results show the optimum salt passage at about the 70/30 ratio with rapid deterioration in performance below about 30/70.

Example 7

Copolyamides of m-phenylenediamine with cyclohexane-1,3,5-tri-carbonyl chloride and azeloyl chloride.

With substrates and procedures as in the previous example, azeloyl chloride (nine carbon straight chain diacid) was compared at several functionalities with two levels of MPD in loading and the results reported in Table 9.

TABLE 9

| Run | MPD % | HTMesCl w/v % | AzCl w/v % | Ratio | Fncl. | % SP/Kw |
|---|---|---|---|---|---|---|
| 7-a | 1.5 | 0.156 | 0.084 | 65/35 | 2.59 | 1.16/3.81 |
| 7-b | " | 0.168 | 0.072 | 70/30 | 2.64 | 1.00/4.63 |
| 7-c | " | 0.180 | 0.060 | 75/25 | 2.69 | 1.15/4.29 |
| 7-d | 1.8 | 0.168 | 0.072 | 70/30 | 2.64 | 1.70/4.54 |
| 7-e | " | 0.180 | 0.060 | 75/25 | 2.69 | 1.31/4.24 |
| 7-f | " | 0.192 | 0.058 | 80/20 | 2.75 | 1.07/4.56 |

While the results do not define closely the optimum in the salt passage, it is clear that low salt passages are obtained in about the same functionality range as with sebacoyl chloride.

I claim:

1. A multilayer reverse osmosis membrane comprising a microporous support layer and superposed thereon a copolyamide layer consisting essentially of units derived from m-phenylenediamine, and acyl units derived from mixtures of cyclohexane-1,3,5-tricarbonyl chloride, and alkylene diacyl chlorides containing 4 to 12 carbon atoms, wherein the average functionality of the acyl chlorides is from about 2.35 to about 2.80.

2. The membrane of claim 1 wherein the microporous layer has an average pore size diameter of less than 20 nanometers.

3. The membrane of claim 2 wherein units derived from only one difunctional chloride are present.

4. The membrane of claim 3 wherein the copolyamide layer is formed in situ on the microporous layer by interfacial condensation.

5. The membrane of claim 2 wherein said microporous layer is polysulfone.

6. The membrane of claim 1 wherein the alkylene diacyl chloride is adipoyl chloride and the average functionality of the acyl chloride is from 2.35 to 2.54.

7. The membrane of claim 1 wherein the alkylene diacyl chloride is sebacoyl chloride and the average functionality of the acyl chloride is from 2.4 to 2.65.

8. The membrane of claim 1 wherein the alkylene diacyl is azelaoyl chloride and the average functionality of the acyl chloride is from 2.6 to 2.8.

* * * * *